United States Patent [19]

Jones

[11] Patent Number: 5,120,508

[45] Date of Patent: Jun. 9, 1992

[54] APPARATUS FOR REMOVING OXIDES OF NITROGEN AND SULFUR FROM COMBUSTION GASES

[76] Inventor: Dale G. Jones, 4455 Gould Ave., La Canada, Calif. 91011

[21] Appl. No.: 179,029

[22] Filed: Apr. 7, 1988

Related U.S. Application Data

[62] Division of Ser. No. 734,393, May 14, 1985, Pat. No. 4,783,325.

[51] Int. Cl.$^5$ .............................................. B01J 8/12
[52] U.S. Cl. .................................... 422/171; 422/170; 422/177; 422/183; 422/212; 422/220
[58] Field of Search ............... 422/170, 171, 183, 212, 422/220, 177

[56] References Cited

U.S. PATENT DOCUMENTS

| | | | |
|---|---|---|---|
| 2,288,091 | 6/1942 | Hoover | 423/400 |
| 2,309,845 | 2/1943 | Hodge | 423/400 |
| 2,491,919 | 12/1949 | Egly | 423/400 |
| 3,589,863 | 6/1971 | Frevel et al. | 423/244 |
| 3,823,676 | 7/1974 | Cook | 110/1 |
| 3,880,618 | 4/1975 | McCrea et al. | 423/239 |
| 3,880,629 | 4/1975 | Dulin | 65/27 |
| 3,932,589 | 1/1976 | Teller | 423/244 |
| 3,957,949 | 5/1976 | Senjo et al. | 423/400 |
| 3,969,482 | 7/1976 | Teller | 423/239 |
| 3,977,844 | 8/1976 | Van Slyke | 48/202 |
| 4,018,868 | 4/1977 | Knight | 423/244 |
| 4,024,219 | 5/1977 | Takahashi et al. | 423/396 |
| 4,061,743 | 12/1977 | Senjo et al. | 423/235 |
| 4,062,926 | 12/1977 | Knight | 423/244 |
| 4,213,944 | 7/1980 | Azuhata et al. | 423/235 |
| 4,309,386 | 1/1982 | Pirsh | 422/177 |
| 4,323,544 | 4/1982 | Magder | 423/239 |
| 4,350,669 | 9/1982 | Izumi et al. | 423/400 |
| 4,375,455 | 3/1983 | Teller et al. | 423/239 |
| 4,385,039 | 5/1983 | Lowell | 423/242 |
| 4,442,079 | 4/1984 | Donnelley et al. | 423/244 |
| 4,442,080 | 4/1984 | Donnelley et al. | 423/244 |
| 4,454,099 | 6/1984 | Moffat | 423/239 |
| 4,564,510 | 1/1986 | Bechthold et al. | 423/235 |
| 4,603,036 | 7/1986 | Botton et al. | 423/235 |

FOREIGN PATENT DOCUMENTS 077170 4/1983 European Pat. Off. .
1547531 6/1979 United Kingdom .

OTHER PUBLICATIONS

Chen et al., "The Oxidation of NO to $NO_2$ During Combustion Quenching Process".
Takahashi et al., "Development of MACT in Furnace $NO_x$ Removal Process for Utility Steam Generators," presented 44th Annual Meeting of the American Power Conference, Apr. 26-28, 1982.
K. Felsvang et al., "Acid Rain Prevention Thru New $SO_x/NO_x$ Dry Scrubbing Process," presented at 1983 Joint Power Convention, Indianapolis, IN, Sep. 1983.
Shah et al., Owens Lake Trona for Dry $SO_2$ Removal, Lake Minerals Corporation, Jun. 1983.
L. J. Muzio et al., "22 MW Coal-Fired Demonstration of Dry $SO_2$ Scrubbing with Sodium Sorbent Compounds".
H. Takeuchi et al., "Simultaneous Absorption of $SO_2$ and $NO_2$ in Aqueous Solutions of NaOH and $Na_2SO_3$," Ind. Eng. Chem. Process Des. Dev., vol. 17, No. 4, 1978.
M. Schutz et al., "Dry Injection Scrubbing of Flue Gases According to the Shu-Process," 1st Joint EPS-/EPRI-Symposium on Dry $SO_2$ and Simultaneous $SO_2/NO_x$ Control Technologies, San Diego, CA.

(List continued on next page.)

Primary Examiner—Jill A. Johnston
Attorney, Agent, or Firm—Christie, Parker & Hale

[57] ABSTRACT

An apparatus is provided in accordance with practice of this invention for lowering the molar ratio of NO to $NO_2$ in flue gas by converting a portion of flue gas nitric oxide (NO) to nitrogen dioxide ($NO_2$), for removing the associated oxides of sulfur ($SO_x$) and nitrogen ($NO_x$) from the flue gas prior to discharge of the flue gas into the atmosphere.

17 Claims, 8 Drawing Sheets

OTHER PUBLICATIONS

Pozdnyakov et al., "Use of IR Spectroscopy to Investigate Chemisorption of Nitric Oxide and Nitrogen Dioxide on Metallic Oxides," *Scientific-Research Institute of Physics, A. A. Zhdanov Leningrad State University*, 1973.

Blyholder et al., "Structure of Surface Species. Adsorption of Nitrogen Dioxide on Oil— and Silica-Supported Nichel and Iron," *The Journal of Physical Chemistry, vol. 70, No. 2, 1966.*

C. Chang, "Infrared Studies of $SO_2$ on Gamma-Alumina," *Journal of Catalysis,* 53, 374–385 (1978).

V. Bland et al., "Characterization of Alternate Sodium Sorbents for Fabric Filter $SO_2$ Capture," presented at First Joint Symposium on Dry $SO_2$ and Simultaneous $SO_2/NO_x$ Control Technologies, Nov. 13–16, 1984, San Diego, Calif.

N. D. Shah, "Polution Control Practices; Dry Scrubbing of $SO_2$," *CEP* Jun. 1982.

H. Takeuchi et al., "Absorption of Nitrogen Dioxide in Sodium Sulfite Solution from Air as a Diluent," *Ind. Eng. Chem. Process Des. Dev.,* vol. 16, No. 4, 1977.

H. Kobayashi et al., "Removal of Nitrogen Oxides with Aqueous Solutions of Inorganic and Organic Reagents," *Environmental Science and Technology,* vol. 11, No. 2, Feb. 1977.

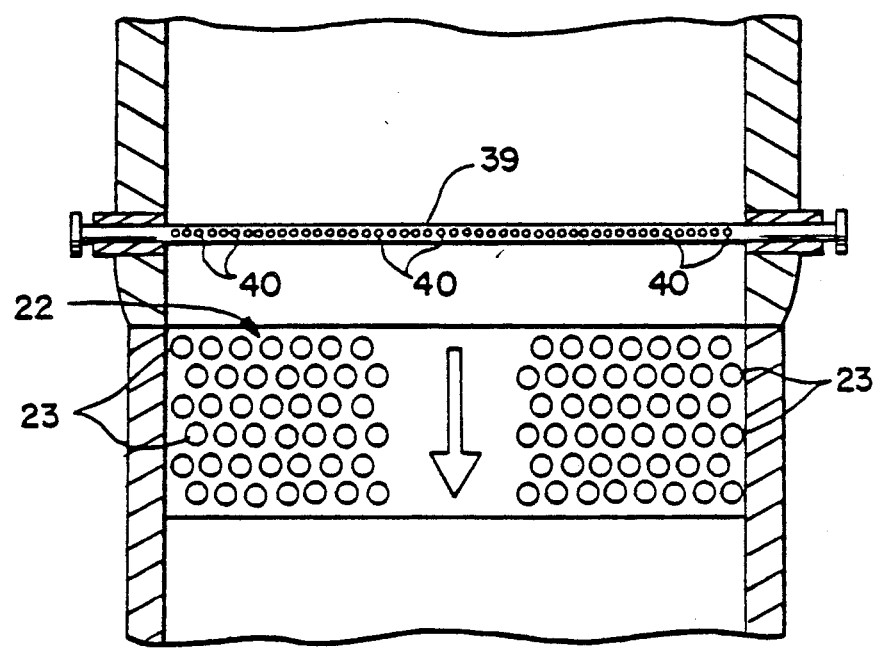
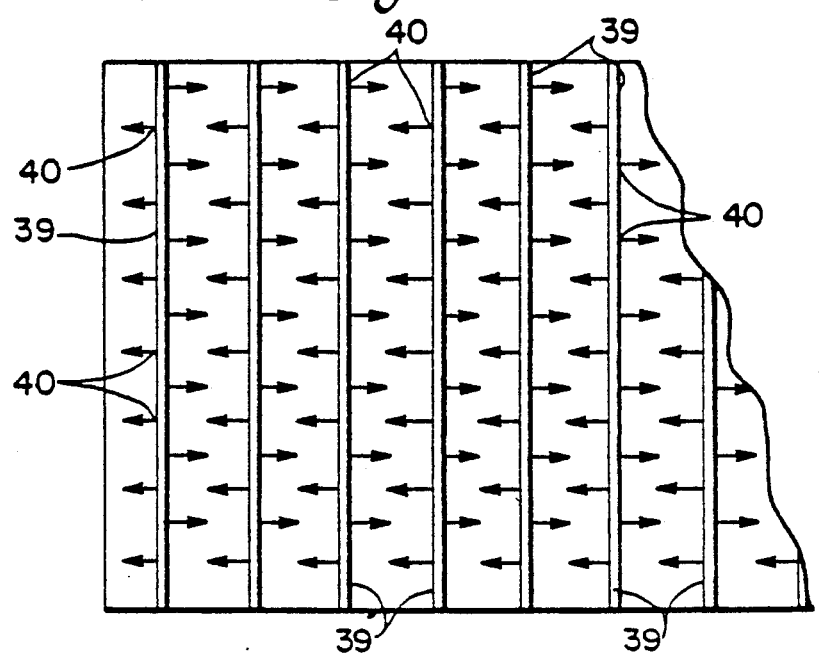

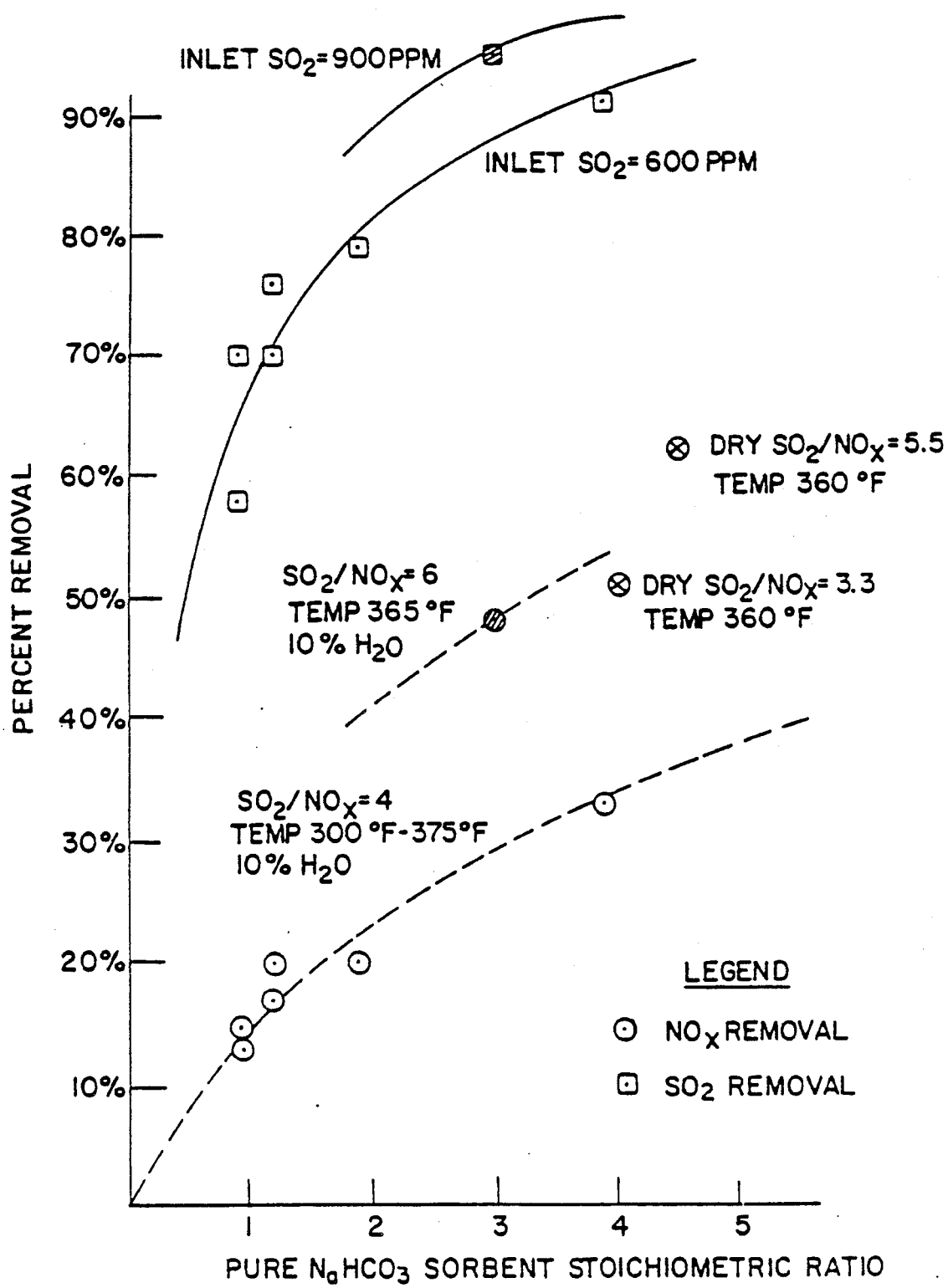

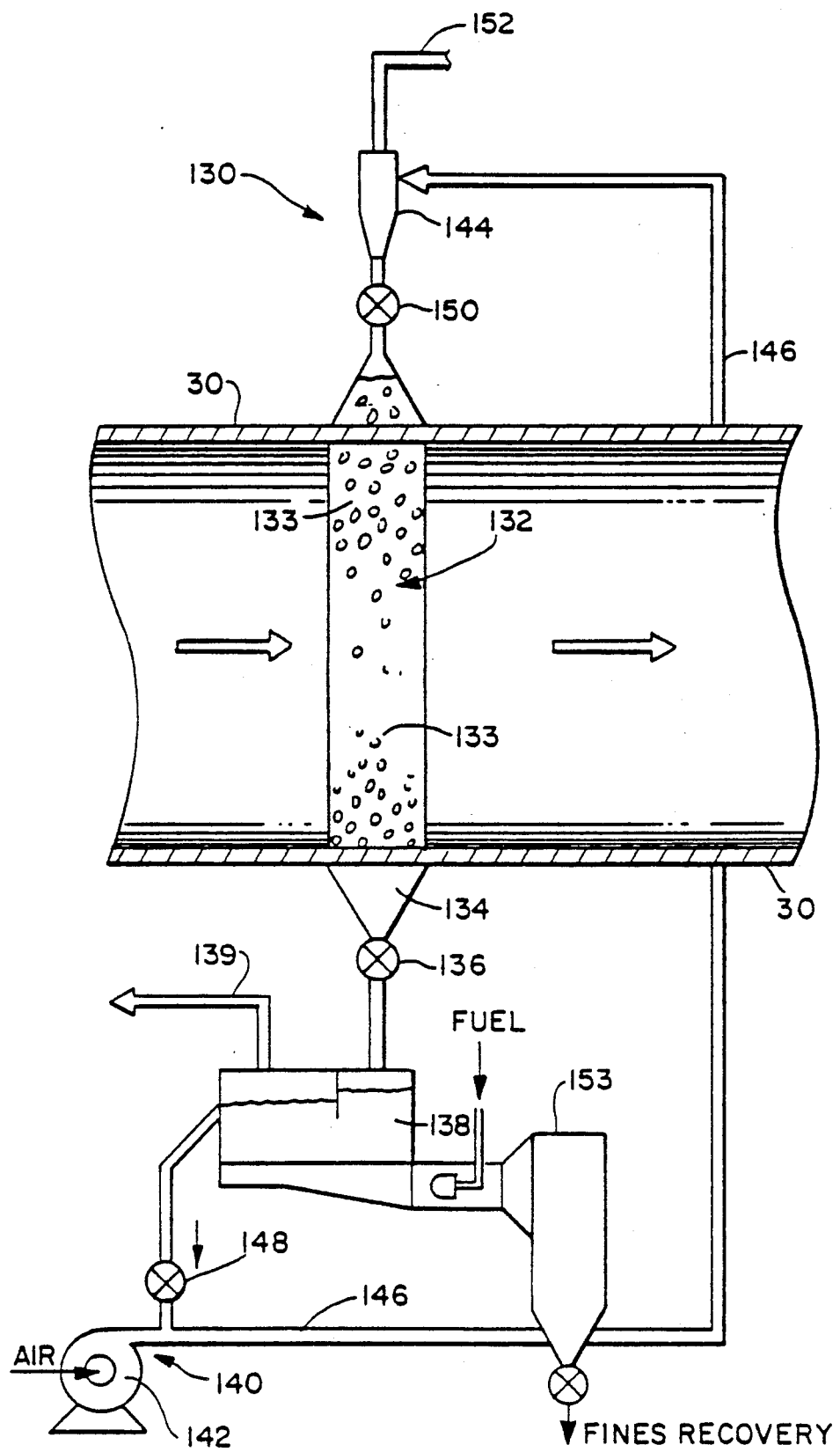

APPARATUS FOR REMOVING OXIDES OF NITROGEN AND SULFUR FROM COMBUSTION GASES

CROSS-REFERENCE TO RELATED APPLICATIONS

This is a division of application Ser. No. 734,393 filed May 14, 1985 now U.S. Pat. No. 4,783,325.

FIELD OF THE INVENTION

This invention relates to techniques for removing oxides of nitrogen and sulfur from combustion products. More particularly this invention relates to techniques for converting nitric oxide (NO) in flue gas to nitrogen dioxide ($NO_2$) and for removing the associated oxides of sulfur ($SO_x$) and nitrogen ($NO_x$) from the flue gas prior to discharge of the flue gas into the atmosphere.

BACKGROUND OF THE INVENTION

Recently, there has been a growing concern regarding problems related to air pollution. One major source of such pollution are emissions from power generating plants. For example, oxides of nitrogen and sulfur are produced in power station boilers by the combustion of the fuel used in the boilers. The nitrogen oxides may be produced by pyrolysis of nitrogen containing compounds in the fuel and may also be produced by reactions of $N_2$ and $O_2$ at elevated temperatures (called nitrogen fixation). Normally the nitrogen oxides are present as nitric oxide (NO), but also other nitrogen oxides, especially $NO_2$, are usually present in small quantities. The oxides of nitrogen are referred to herein as $NO_x$. The dxides of sulfur are mainly present as $SO_2$ with minor amounts of $SO_3$ present. The oxides of sulfur are referred to herein as $SO_x$.

The $SO_x$ and $NO_x$ emissions are desirably removed from the flue gas prior to discharge into the atmosphere because $SO_x$ combines with atmospheric water vapor to form acids of sulfur. In a like manner, $NO_x$ combines with atmospheric water vapor to form acids of nitrogen. These acids then fall to the earth as "acid rain", undesirably making the environment more acidic. The nitrogen oxides also contribute to air pollution by taking part in the formation of photochemical smog.

One method of providing relatively low levels of $SO_x$ and $NO_x$ emission is to use clean fuels, such as light fuel oil or natural gas, which are expensive. Less costly fuels, such as coal, produce much higher levels of uncontrolled $NO_x$ and $SO_x$ pollution. If a low-cost method of achieving simultaneous $NO_x/SO_x$ control were available, then dirty fuels, such as coal, could be used with corresponding economic benefit to the users.

SUMMARY OF THE INVENTION

This invention relates to a method for converting NO to $NO_2$ which comprises the steps of contacting an NO containing gas stream with an injection gas which includes a peroxyl initiator and sufficient oxygen to provide for conversion of NO to $NO_2$.

In another embodiment of this invention, methods are provided for removing nitrogen oxides and sulfur oxides from a gas stream. Such a method comprises the steps of contacting a first gas stream which contains nitrogen oxides, including NO and $NO_2$ at a molar ratio of NO to $NO_2$ greater than about 4 and sulfur oxides, in a conversion zone with an injection gas that comprises oxygen and a vaporized peroxyl initiator. The oxygen and vaporized peroxyl initiator are present in an amount sufficient to convert NO to $NO_2$ in the conversion zone to thereby provide a resulting gas stream leaving the conversion zone having an NO to $NO_2$ molar ratio of less than about 2. In an absorption zone the resulting gas stream is contacted with a particulate sorbent for oxides of nitrogen and sulfur to thereby remove said oxides of nitrogen and sulfur from the gas stream.

The invention also relates to an apparatus for conducting the above methods. In one embodiment the apparatus comprises two sections; a conversion section for converting NO to $NO_2$ and an absorption section for removing $SO_x$ and $NO_x$ from the gas stream exiting the conversion section. The NO to $NO_2$ conversion section includes a gas duct having an inlet and an outlet and a gas contacting section located therebetween. Means are provided for introducing a first gas stream containing NO, $NO_2$ and sulfur oxides into the gas duct inlet. Means are also provided for introducing an injection gas comprising a peroxyl initiator and oxygen into the gas duct contacting section for contacting the NO, $NO_2$ and sulfur oxide containing first gas stream. The peroxyl initiator and oxygen are present in an amount sufficient to convert NO and $NO_2$ to thereby provide a second gas stream exiting the contacting section. The absorption section comprises means for receiving the second gas stream as it exits the NO to $NO_2$ conversion section and means for introducing a substantially dry particulate sorbent into the second gas stream. The sorbent removes oxides of sulfur and nitrogen from the gas stream. Finally, means are provided for removing reacted sorbent and any unreacted sorbent from the second gas stream to provide a clean waste gas stream which is discharged into the atmosphere.

BRIEF DESCRIPTION OF THE DRAWINGS

These and other features, aspects, and advantages of the present invention will be more fully understood when considered with respect to the following detailed description, appended claims, and accompanying drawings, wherein:

FIG. 2 is a schematic cross-sectional view taken on line 2—2 of FIG. 1;

FIG. 3 is a schematic fragmentary cross-sectional view taken on line 3—3 of FIG. 1;

FIG. 10 is a graph showing the percent removal of $NO_x$ and $SO_x$ as a function of the stoichiometric ratio of sorbent used; and FIG. 11 is a schematic view of an $NO_x$ sorption system useful in practice of this invention for installation downstream from a baghouse.

DETAILED DESCRIPTION

Figure 1:
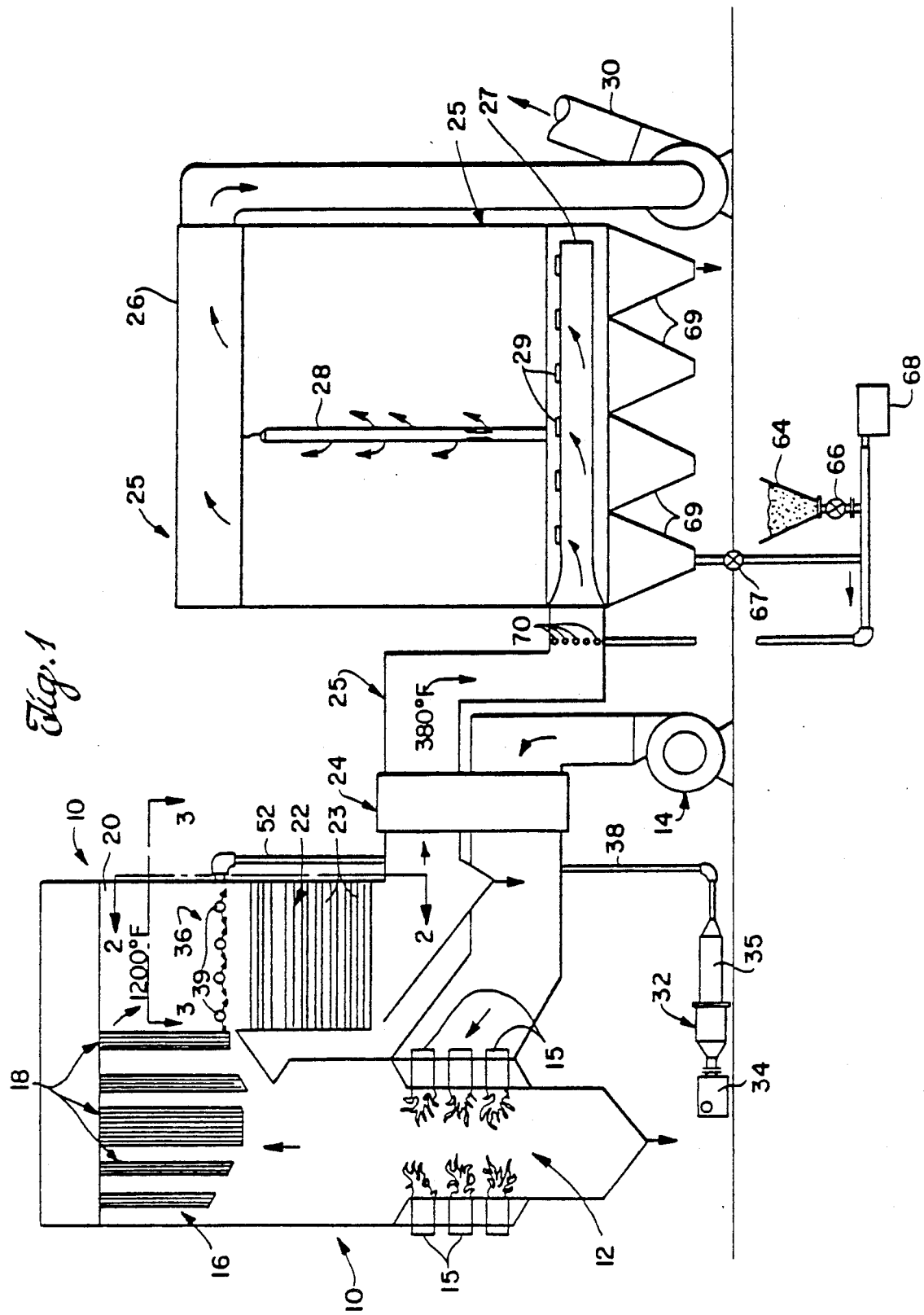
FIG. 1 is a schematic, perspective view of one embodiment of a boiler and associated pollution control equipment useful for practice of principles of this invention.

Referring to FIG. 1 an exemplary embodiment of a boiler off-gas pollution control system useful in accordance with practice of principles of this invention is shown. A boiler 10, which may be either coal or oil fired, comprises a burner section 12 in which air supplied by a blower 14 is combusted in burners 15 for example, to produce furnace gas at a temperature of about 2200° F.

The furnace gas (flue gas) includes products of combustion from the burners, uncombusted fuel and air, and also typically contains undesirable levels of $SO_x$, $NO_x$ and particulate pollutants depending upon the composition of the fuel being burned. Techniques are provided in accordance with practice of principles of this invention for removal of such pollutants including $SO_x$ and $NO_x$ prior to discharge of the flue gas into the atmosphere. The flue gas passes from the burner section 12 through a pendant section 16 of the boiler downstream to thereby heat fluid that is flowing through the tubes 18. The flue gas, as it leaves the pendant section and flows through the conduit 20, i.e., the boiler rear cavity, is at about 1200° F. or so in one embodiment. From the rear cavity 20, the flue gas passes through a convective section 22 of the boiler dropping in temperature as it heats fluid that flows through the convective section tubes 23. In one embodiment the flue gas temperature at the outlet of the convective section is about 800° F. The flue gas passes from the convective section through an air preheater 24 to preheat the boiler supply air and thence into an absorption section of the system (generally shown at 25) which, in the illustrated embodiment, includes a baghouse 26. In one embodiment, the flue gas temperature as it enters the absorption section of the system is at about 325° F. In the absorption section any $NO_x$ and $SO_x$ in the flue gas is removed therefrom by means of a particulate sorbent (absorbent) for such $NO_x$ and $SO_x$. The flue gas passes through bags 28 (only one is shown) in the baghouse where the $NO_x$ and $SO_x$, along with entrained materials including the particulate sorbent are removed. In the illustrated embodiment, clean flue gas is discharged into the atmosphere from the baghouse via a conduit 30 leading to a flue gas stack.

Typically $NO_x$, as it exits the burner section 12 of the boiler, comprises about 95% NO and about 5% $NO_2$. It was discovered that if the molar ratio of NO to $NO_2$ in the flue gas is reduced to levels below about 2, then surprisingly high $NO_x$ removal levels were observed by means of particulate sorbents described below as being useful in practice of this invention. Therefore, in a first technique provided in accordance with this invention, NO in the flue gas is converted to $NO_2$. The conversion is accomplished by contacting the NO containing flue gas stream with an injection gas which comprises both an initiator material for the peroxyl radical ($HO_2$) and sufficient oxygen to convert NO to $NO_2$. Preferably, as is described below in greater detail, the peroxyl initiator is heated and vaporized prior to its contacting the NO containing flue gas.

The reaction (conversion of NO to $NO_2$) takes place in the presence of such a peroxyl radical. A typical conversion reaction when the peroxyl initiator propane is used, for example, is:

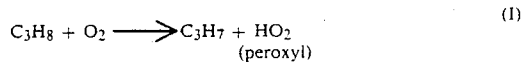

$$C_3H_8 + O_2 \longrightarrow \underset{\text{(peroxyl)}}{C_3H_7 + HO_2} \quad (I)$$

This reaction occurs at about 842° F. NO is then converted to $NO_2$ in accordance with the following reaction:

$$NO + HO_2 \rightarrow NO_2 + OH \quad (II)$$

It has been shown that these reactions take place to a desirable degree only when the percentage of oxygen present is greater than about 3%. For example, it is known that less than 20% conversion of NO to $NO_2$ is obtained at a flue gas excess $O_2$ content of 3% while at least about 90% conversion can be obtained if the flue gas excess $O_2$ is increased to 9% or more. Boilers operate most efficiently at 3% to 5% excess $O_2$ in the flue gas, depending on a number of factors including tendency to form smoke, efficiency of the burners in promotion of air/fuel mixing, air preheater in leakage and/or other factors. It is not desirable to operate a boiler at levels of excess $O_2$ as high as 9% (or more) which will give the desired percentage conversion of NO to $NO_2$, because the size of the boiler for a given output would have to be much larger to accomodate the increased quantity of flue gas flowrate. Additionally, increasing the excess oxygen can result in less efficient boiler operation due in large part to heat lost from the stack.

As is described below in greater detail, techniques are provided in accordance with this invention which provide for desirably high levels of NO to $NO_2$ conversion in the convective section of a conventional boiler at flue gas temperatures of from about 800° F. to about 1400° F. This is accomplished without increasing the size of the boiler and while still maintaining flue gas oxygen concentrations in the 3% to 5% range. Such NO to $NO_2$ conversion is an important feature of the present invention.

Referring again to FIG. 1, to effect the above described conversion of NO to $NO_2$, a conversion system or apparatus, generally shown at 32, is installed on the boiler 10 in accordance with practice of this invention. In one embodiment the conversion system 32 includes an air compressor 34, a source of peroxyl initiator material such as propane (not shown), a premixer/preheater unit 35 and a gas injection grid 36. Air from the air compressor 34 is mixed with a peroxyl initiator, e.g., propane, in the premixer/preheater and the propane is heated. The heated (vaporized) propane is then passed through a pipe 38 into a manifold (not shown) and thence into an array of distributor tubes 39 which make up the gas injection grid 36. In the illustrated embodiment, the tubes 39 are located in the rear cavity 20 of the boiler 10 just upstream from the boiler convective section 22.

The injection grid 36 preferably extends into the rear cavity or gas contacting section of the boiler across the flue gas stream transverse to direction of gas flow. The arrangement of the tubes 39 can be better understood by referring to FIGS. 2 and 3 in addition to FIG. 1. The plurality of tubes 39 which form the grid 36 are parallel to each other with their longitudinal axes transverse to the direction of flow of the flue gas. Each tube 39 has a plurality of holes 40 along its length which act as nozzles for the vaporized propane. Preferably, as is best seen in FIG. 1, the holes are aligned so that the direction of flow of heated propane is about 10° to 20° from an imaginary plane passing through the array. This provides for the heated propane to be introduced into the flue gas stream without impinging on adjacent distributor tubes, thereby reducing tube soot formation and promoting nozzle cleanliness. Preferably, the heated propane is introduced in the direction of flue gas flow as shown. In this embodiment, since the vaporized propane enters the flue gas downstream from the distributor tubes, the tubes do not become coated with soot from the propane oxidation reactions.

Figure 4:
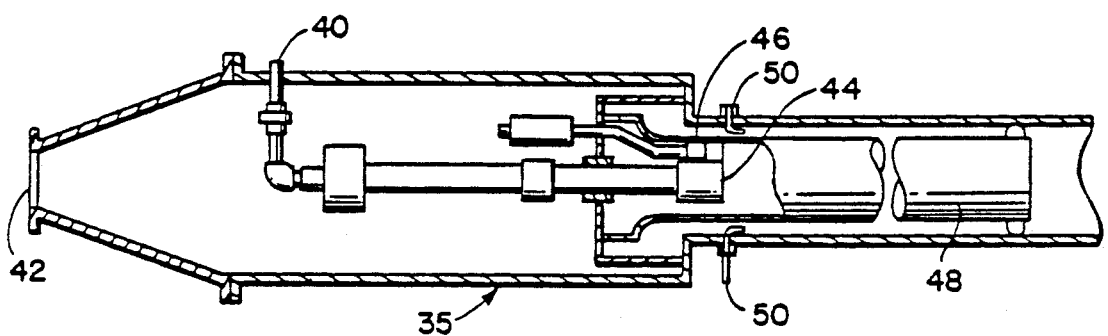
FIG. 4 is a semi-schematic cross-sectional view of the preheater shown in FIG. 1.

Turning to FIG. 4 there is shown a semi-schematic cross-sectional view of an exemplary embodiment of a premixer/preheater 35 useful in practice of this invention. The illustrated premixer/preheater is a modification of the type sold by John B. Zink Co. and identified as model TH-210.

Propane (or other such peroxyl initiator) is introduced into the premixer/preheater through a main gas connection 40. Air, oxygen or recirculated flue gas or mixtures thereof are introduced at the inlet 42. The air/propane mixture which, in accordance with this invention is provided with oxygen in excess of the stoichiometric amount required to burn the propane, is ignited at a burner gas tip 44, for example, by means of a pilot 46. The combustion gas formed by the burning propane exits the end of a shroud 48 and mixes with propane that is introduced into the premixer/preheater via the connections 50. (In one embodiment of the use of the premixer/preheater, the propane is heated to between ambient temperature and about 800° F.) The heated vaporized propane and excess oxygen (the injection gas) flows from the premixer/preheater through the pipe 38 into the distributor pipes 39 of the grid 36. From the grid 36 the injection gas is introduced into the rear cavity conduit 20 just upstream from the boiler convective section 22.

The injection gas is introduced in a sufficient quantity and at a sufficient velocity to provide a barrier or blanket of such gas that extends across essentially the entire rear cavity (conduit) 20 cross-section transverse to the direction of flow of the NO containing flue gas stream. The NO containing gas stream contacts the injection gas (the vaporized peroxyl initiator and oxygen) as it (the NO containing gas) flows through the conduit. As the NO in the flue gas contacts the vaporized injection gas mixture, the NO is converted to $NO_2$ in accordance with the above reactions I and II.

In an exemplary embodiment of practice of this invention, propane is used as the peroxyl initiator. The temperature of the heated propane/oxygen mixture (the injection gas) at the time of injection into the flue gas stream is preferably less than about 800° F. At greater than about 800° F. the peroxyl radicals can form before the injection gas is introduced into the flue gas stream. Since the life of the peroxyl radical is less than about 40 milliseconds, such radicals formed prior to introduction into the flue gas, may be extinguished and thus, not available for the conversion reaction. Therefore, it is not preferred that the propane (injection gas) be heated to greater than about 800° F. in the premixer/preheater 35 or in the injection grid 39.

Preferably, the $O_2$ concentration of the injection gas is from about 5% to about 20% by volume $O_2$. At less than about 5% there is insufficient $O_2$ to cause a desirably high conversion of NO to $NO_2$ when the boiler flue gas also contains low levels of $O_2$, typically less than 5%. Alternatively, it is not economical or necessary to provide $O_2$ at greater than about 20%.

An important feature of this invention is that the oxygen concentration provided at the reaction site (the site of conversion of NO to $NO_2$) by means of the high oxygen content injection gas is sufficient to promote such conversion. This provision of sufficient oxygen is accomplished without requiring levels of excess $O_2$ as high as 9% (or more) in the boiler flue gas, and hence without increasing the size of the boiler.

It is preferred that the NO containing gas stream is at a temperature of from about 800° F. to about 1400° F. at the time of contact with the injection gas. At less than 800° F., the temperature is not sufficiently high to generate the required peroxyl radicals. Thus, little if any conversion takes place. On the other hand, when the flue gas temperature is greater than about 1400° F., different hydrocarbon radicals predominate and the effect is to cause NO to be reduced to nitrogen gas, rather than to be oxidized to $NO_2$.

Generally, in boiler systems, the NO containing flue gas stream has a velocity of from about 30 feet per second to about 70 feet per second. Preferably, the injection gas is sprayed into the conduit 20 across the path of the NO containing gas stream at a velocity at least about 10 times higher than the velocity of the NO containing flue gas stream. This high velocity for the injection gas is required, in part, so that a blanket or barrier of such injection gas is across the entire flue gas flow path. Thus, all of the flue gas must pass through and contact the injection gas as it travels through the boiler convective section.

In one exemplary embodiment, an NO containing flue gas stream entering the rear cavity 20 is at 1200° F. and is provided at a volumetric flow rate of 11,800 cubic feet per minute (CFM) at a velocity of 30 feet per second. An injection gas at less than 800° F. is provided at 650 (CFM) and is introduced through the distributor tubes 39, which, in this embodiment, have a total of 168 injection holes with each hole being about 0.187 inches in diameter. The velocity of the injection gas in this embodiment is about 600 feet per second. The injection gas provides a blanket across the entire crosssection of the rear cavity 20 of the boiler. All flue gas passing from the burner section 12 into the boiler convective section 22 passes through the injection gas blanket. The contact of the NO containing flue gas with the injection gas results in conversion of NO in the flue gas to $NO_2$.

Although the vaporized peroxyl initiator material is described above with reference to propane, it is contemplated that other such peroxyl initiator materials can also be used. The term "peroxyl initiator" as used herein includes hydrocarbons, i.e., compounds that consist of only carbon and hydrogen, compounds that include carbon, hydrogen and oxygen (oxygen substituted hydrocarbons), and materials that contain only hydrogen and oxygen such as hydrogen peroxide. Hydrogen gas can also be used.

Examples of "peroxyl initiators" useful in practice of principles of this invention include, but are not limited to, propane, benzene, ethane, ethylene, n-butane, n-octane, methane, hydrogen, methanol, isobutane, pentane, acetylene, methyl alcohol, ethyl alcohol, acetone, glacial acetic acid, ethyl ether, propyl alcohol, nitrobenzyl alcohol, methylethylketone, propylene, toluene, formaldelyde, camphor, ether and glycol and mixtures thereof. Additionally, as it is mentioned above, hydrogen peroxide and hydrogen gas can be used.

It is thought that the use of peroxyl initiators which include oxygen, for example, methanol, hydrogen peroxide, etc., or ether, either alone or in combination with hydrocarbons such as propane, will provide an additional source of oxygen which should facilitate the NO to $NO_2$ conversion at low levels of excess $O_2$ in boiler flue gas.

EXAMPLE 1

Conversion of NO to $NO_2$ in Boiler Convective Passages

Figure 5:
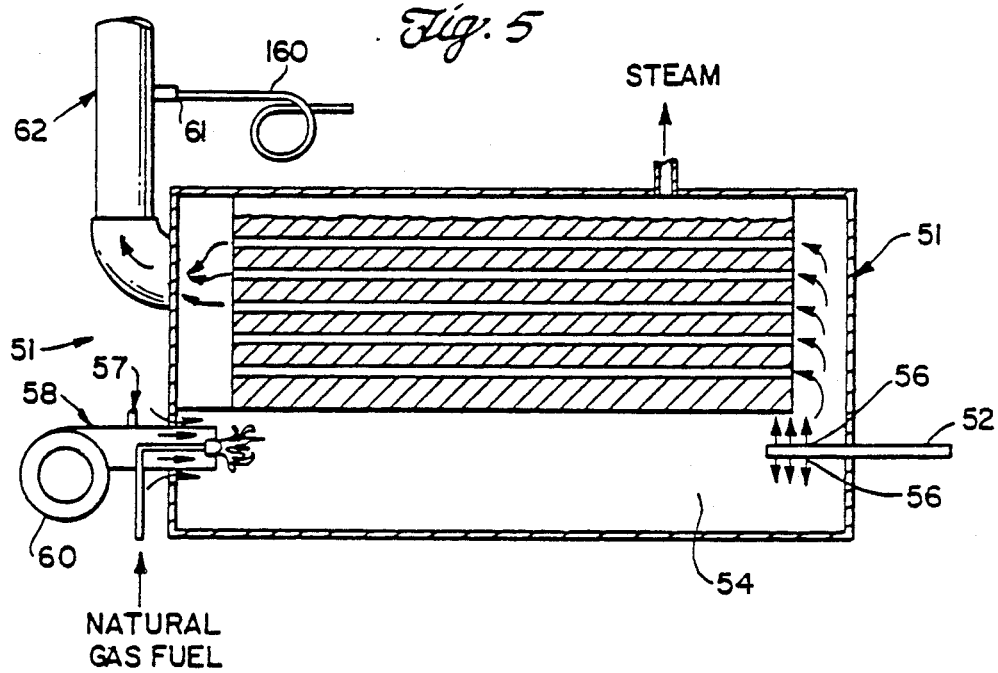
FIG. 5 is a schematic view of the apparatus used in carrying out Example 1.

Tests were conducted to convert NO to $NO_2$ in the convective passages of a boiler. Turning to FIG. 5 there is shown a schematic view of a boiler 51 used in the tests of this example. The boiler 51 is a 10 horse power (H.P.) firetube boiler manufactured by McKenna Boiler Works of Los Angeles, Calif. The heating surface is 64 square feet, with a 125 psig steam pressure rating. The burner is gas fired with a spark igniter.

A stainless steel injection probe 52 extends into the boiler convective passage 54. The probe has 18 radial injection gas holes 56 through its walls (only six such holes are illustrated). The probe air supply was provided by air compressor (not shown), rated to provide over 7 SCFM at 20 psig. The probe injection pressure for these tests was 5.0 psig. The gas injection temperature was about 250° F. at the end of the probe, as measured by a thermocouple (not shown) on the inside of the probe. The calculated gas flowrate at 5.0 psig is about 5.3 SCFM, amounting to between 4% and 8% of the total flue gas flowrate, depending on firing conditions.

Detailed temperature surveys were conducted in the region of the convective passage in the vicinity of the probe. These tests were done while injecting both air and propane, to obtain temperature survey information which included the effects of the injection probe on firing conditions.

In order to conduct the tests, NO gas was injected through a port 57 into a burner 58 at the discharge of a fan 60. The NO and propane injection rates were controlled by rotameters (not shown).

Flue gas samples were continuously withdrawn from a sample port 61 on a boiler stack 62 at a rate of about 2.5 SCFH. The gas samples were passed through an $NO-NO_x$ analyzer and an oxygen detector for excess $O_2$ measurement.

The flue gas flowrate was calculated by two methods. The first method was based on the known rate of NO addition and measured concentration of $NO_x$ in the stack gas. This method predicts flue gas flow rates which are lower than actual, due to the NO destruction which occurs in the flame. The second method was based on the measured increase in flue gas excess oxygen content caused by addition of a known rate of ambient air addition through the injection probe. The rate of NO addition was not varied during the tests.

By the first method, with 1.03 SCFH addition of NO gas, resulting in 276 ppm $NO_x$ at 3% $O_2$, dry, and using the combustion factor of 9565 SCF/MMBTU at 3% $O_2$, dry for natural gas fuel, the flue gas flowrate was calculated to be 62.2 SCFM (3% $O_2$, dry), equivalent to 400,000 BTU/hr firing rate.

By the second method, with 5.45 SCFM addition of ambient air (20.9% $O_2$), and an equivalent increase in flue gas excess $O_2$ content from 3.4% to 4.2%, dry, the flue gas flowrate was calculated to be 68.2 SCFM (3% $O_2$, dry). The average of the two methods comes out to 65.2 SCFM at 3% $O_2$, dry.

Specific comparison of boiler operating characteristics before and after the injection air and propane were turned on are shown in Tables 1 and 2 below. The first test (shown in Table 1) was conducted at the maximum firing rate of 730,000 BTU/hr. With the excess $O_2$ at 3.2%, approximately 2480 ppm of propane was injected into the flue gas via the probe 52, along with about 6.2 SCFM of ambient air. This resulted in converting 55% of the NO into $NO_2$ at a gas temperature of 1350° F. The amount of propane used was about 6.8% of the total fuel used. The excess $O_2$ content of the flue gas was increased to 3.7%.

In the second test (shown in Table 2), the firing rate was reduced to about 60% of maximum, which resulted in an increase in the excess $O_2$ content, as would normally be expected. With the excess $O_2$ at 3.4% approximately 1900 ppm of propane was injected into the flue gas, along with about 5.5 SCFM of ambient air. This resulted in converting 71% of the NO into $NO_2$ at a gas temperature of 1230° F. The amount of propane used was about 5.4% of the total fuel used. The excess $O_2$ content of the flue gas was increased to 4.2%.

These tests show that high levels of NO to $NO_2$ conversion can be achieved by injecting a premixed gas containing ambient air and propane into a conventional boiler, at a location in the boiler where the flue gas is within an appropriate temperature range from 800° F. to 1400° F. Conversion percentages between 55% and 71% were obtained over a wide range of firing conditions, and the increase in flue gas excess $O_2$ caused by the injection probe was limited to less than 1.0% above the initial condition.

This conversion of NO to $NO_2$ was accomplished without quenching of the flue gas temperatures. For example, in the tests conducted the conversion takes place in a time of about 40 milliseconds and the flue gas temperature drop caused by cooling effects of the injection gas is only from about 50° F. to about 80° F. However, the temperature increase of the flue gas and injection gas caused by exothermic oxidation of the propane is from about 220° F. to about 310° F., thus yielding a net increase in flue gas temperature in the region of the probe injection point and in the mixing region where the NO to $NO_2$ conversion takes place.

TABLE I

|  | Before propane Injection | After propane Injection |
| --- | --- | --- |
| Firing Rate: | 730,000 BTU/hr | 780,000 BTU/hr |
| Flue Gas Flowrate: | 142 SCFM (wet) | 148 SCFM (wet) |
| Probe Depth: | 6.5 in. | 6.5 in. |
| Flue Gas Temperature: | 1430° F. ± 50° F. | 1350° F. ± 50° F. |
| Injection Pressure: | zero | 5.0 psig |
| Percent Injection Gas: | zero | 4.4% of flue gas |
| Propane Rate: | zero | 0.367 SCFM |
| Propane/Flue Gas: | zero | 2480 ppm (wet basis) |
| Flue Gas Oxygen: | 3.2% (dry) | 3.7% (dry) |
| NO Concentration, 3% $O_2$, dry: | 147 ppm | 66 ppm |
| Percent NO Conversion: | Base | 55% |

TABLE II

|  | Before propane Injection | After propane Injection |
| --- | --- | --- |
| Firing Rate: | 400,000 BTU/hr | 420,000 BTU/hr |
| Flue Gas Flowrate: | 77.6 SCFM (wet) | 83.1 SCFM (wet) |
| Probe Depth: | 2.75 in. | 2.75 in. |

TABLE II-continued

|  | Before propane Injection | After propane Injection |
|---|---|---|
| Flue Gas Temperature: | 1010° F. ± 50° F. | 1230° F. ± 50° F. |
| Injection Pressure: | zero | 5.0 psig |
| Percent Injection Gas: | zero | 7.0% of flue gas |
| Propane Rate: | zero | 0.159 SCFM |
| Propane/Flue Gas: | zero | 1910 ppm (wet basis) |
| Flue Gas Oxygen: | 3.4% (dry) | 4.2% (dry) |
| NO Concentration, 3% O$_2$, dry: | 131 ppm | 38 ppm |
| Percent NO Conversion: | Base | 71% |

Turning again to FIG. 1, after the flue gas passes through the conversion zone where NO is converted to NO$_2$, the flue gas with reduced levels of NO and increased levels of NO$_2$ passes from the convective section of the boiler 10 (the NO to NO$_2$ conversion section), through an air preheater section 24 and then into the absorption section 25 of the system. (Since the conversion of NO to NO$_2$ takes place in the area of the boiler between the grid 36 and the topmost tubes 23 in the convection section 22, this space is termed the "conversion section" herein). The absorption section of the system, in one embodiment, includes means for receiving the gas stream as it exits the NO to NO$_2$ conversion section and means for introducing a substantially dry particulate sorbent into the gas stream for sorbing oxides of sulfur and nitrogen therefrom to provide a reacted sorbent. Means are also provided for removing the reacted sorbent and any unreacted sorbent from the gas stream to provide a clean waste gas stream which can be discharged into the atmosphere.

In the illustrated embodiment of FIG. 1, a dry particulate sodium based sorbent such as Trona or Nahcolite is introduced into the gas stream at the entrance to the baghouse 26 (Trona is Na$_2$CO$_3$NaHCO$_3$2H$_2$O whereas Nahcolite is NaHCO$_3$.) The fresh sorbent is stored in one or more hoppers 64 and is fed through a rotary lock valve 66 located below the hopper 64 into an air stream provided by a blower 68. Some of the partially-reacted sorbent from the baghouse hoppers 69 is recycled via rotary lock valves 67 located below hoppers 69 into an air stream provided by the blower 68. Depending on the ash content of the primary fuel, as much as 85% of the sorbent from the baghouse hoppers 69 can be recycled to increase the sorbent utilization and the effectiveness of the NO$_x$/SO$_x$ sorption reaction. The balance of the sorbent from the baghouse hoppers 69 is discharged as spent sorbent material. (If desired, the sorbent transport media can be steam or flue gas or the like or mixtures of steam and flue gas with air). The air stream and entrained sorbent passes through a plurality of holes or nozzles (not shown) in an array of tubes 70 that extend into the flue gas flow path near the entrance to the baghouse. It is also possible to provide a flue gas and sorbent distribution manifold or ducts 27 with discrete discharge ports 29, to promote uniform distribution of flue gas and sorbent materials on the baghouse filtration surfaces. The particulate sorbent reacts with the NO$_x$ and oxides of sulfur (SO$_x$) in the flue gas to remove SO$_x$ and NO$_x$ from the flue gas. The average particle size of the sorbent used is preferably less than about 60 microns to enhance gas-solid distribution in the gas stream which, in turn, promotes more uniform distribution of solids on the baghouse filtration surfaces, resulting in more effective absorption of the SO$_x$ and NO$_x$ from the gas. The flue gas and particulate sorbent enters the baghouse where the gas passes through the filtration surfaces 28 and is discharged as clean flue gas through the conduit 30, to the stack and thence into the atmosphere. Preferably, the nozzles 29 extending from the manifold 27 direct the flue gas upwardly into the baghouse filtration surfaces. The particulate sorbent is filtered from the flue gas by the filtration surfaces supported on the bags. During a sequential bag cleaning cycle, the particulate sorbent, plus any noncombustible ash from the fuel, is dislodged and falls into the discharge hoppers 69 and is either discarded or recycled for further use. The recycle ratio can be adjusted by suitable connection of rotary lock valves and transport pipes (not shown).

The chemistry involved in removal of oxides of sulfur and oxides of nitrogen from a flue gas using a sodium based sorbent such as sodium bicarbonate can be understood with reference to the following equations:

$$SO_2 + 2NaHCO_3 \rightarrow Na_2SO_3 + H_2O + 2CO_2 \quad \text{(III)};$$

$$\tfrac{1}{2}NO_2 + Na_2SO_3 \rightarrow Na_2SO_4 + \tfrac{1}{4}N_2 \quad \text{(IV)}$$

The overall reaction is given by the following:

$$SO_2 + \tfrac{1}{2}NO_2 + 2NaHCO_3 \rightarrow Na_2SO_4 + H_2O + 2CO_2 + \tfrac{1}{4}N_2 \quad \text{(V)}$$

It is also thought that the following reaction takes place:

$$NO_2 + NaHCO_3 \xrightarrow{SO_2} NaNO_3 + CO_2 + \tfrac{1}{2}H_2O \quad \text{(VI)}$$

It can be seen from the foregoing reactions that SO$_2$ is required to be present in the flue gas in order for NO$_2$ to be removed by NaHCO$_3$. Nitric oxide (NO) is also sorbed on NaHCO$_3$ material or Trona material in the presence of SO$_2$, forming NaNO$_2$ byproduct in a reaction similar to reaction VI. The NaNO$_2$ byproduct can be oxidized to NaNO$_3$ while in contact with flue gas.

Another reaction which has been observed is the conversion of some nitric oxide (NO) to nitrogen dioxide (NO$_2$) during the sorption of NO$_x$ and SO$_x$ with sodium-based dry particulate sorbents. the chemistry of this reaction is not fully understood, but as will be described in Example 7, the practice of the present invention is useful in reducing the total amount of nitrogen dioxide (NO$_2$) being discharged from the SO$_x$/NO$_x$ absorption section. In order to verify that nitrogen dioxide (NO$_2$) is absorbed, tests were conducted using NO$_x$ which did not contain any nitric oxide (NO), as will be described in Examples 2 and 3.

The conversion of some of the NO to NO$_2$ during the simultaneous absorption of SO$_x$ and NO$_x$ with sodium-based sorbents brings up the need for removal of nitrogen dioxide (NO$_2$) downstream from the sodium-based absorption section. In one embodiment of the present invention, a metal oxide absorption section is used for NO$_x$ removal in general and NO$_2$ removal in particular. The metal oxide can be easily regenerated by heating to over 700° F., which produces an off-gas stream containing nitric oxide (NO). This off-gas stream can be recycled to the main burners on the boiler, where most of the extra nitric oxide (NO) is destroyed in the flame zone.

While the present invention is described above with reference to the sorbents Trona and Nahcolite, other sodium based sorbents can also be used as well as calcium based sorbents such as $Ca(OH)_2$. Additionally, hydrated lime prepared with a sodium-based liquid to obtain a dried $Ca(OH)_2$ powder with a sodium-enriched particle surface can be used. In one exemplary embodiment, the particulate sorbent comprises a mixture of about 15% $NaHCO_3$ and 85% $Ca(OH)_2$ by weight. (Preferably, the sorbent comprises at least about 5% $NaHCO_3$, $Na_2CO_3$ or mixtures thereof). Alternatively, if desired, instead of the particulate absorbent being introduced into the flue gas stream at the entrance to the baghouse, the absorbent may be introduced into the gas stream in a spray dryer with the outlet of the spray dryer discharging into the baghouse.

In yet another embodiment of practice of this invention, the absorption zone comprises two sections. In a first section of the absorption zone the flue gas stream exiting the NO to $NO_2$ conversion zone (the second gas stream) is contacted with a particulate sorbent for oxides of nitrogen and sulfur to thereby remove oxides of nitrogen and sulfur from the gas stream forming a third gas stream. The third gas stream is then passed into a second section of the absorption zone wherein the third gas stream and particulate sorbent contact a liquid sorbent for $NO_2$ and sulfur oxides. The liquid sorbent removes $NO_2$ and sulfur oxides not removed by the particulate sorbent and also removes the particulate sorbent.

The molar ratio of $SO_2/NO_x$ has an effect on the amount of removal of $NO_x$ from the flue gas by particulate sorbents such as those used in practice of this invention. For example, when $NaHCO_3$ is used, it is preferable that the $SO_2/NO_x$ ratio is greater than about 3 and more preferably the ratio is greater than about 5. When high sulfur fuel is burned the ratio of $SO_2$ to $NO_x$ can be as high as 30/1 and when low sulfur fuel is burned the $SO_2/NO_x$ ratio can be as low as 1/1. Thus, by selecting the fuel to be burned, the ratio can be maintained in the preferred range for the dry sorbent being used.

In another embodiment of the present invention, the flue gas with reduced levels of NO and increased levels of $NO_2$ passes from the conversion section of the boiler to a conventional wet scrubber. In this embodiment the wet scrubber comprises a liquid sorbent or sorbents for $SO_2$ removal, e.g., an alkali such as $Ca(OH)_2$ or $CaCO_3$, with the addition of NaOH or $Na_2CO_3$ for enhanced $NO_2$ removal. Preferably, the alkali contains at least 5% by weight sodium compounds. The $SO_2$ and $NO_2$ are removed via the scrubber and the clean flue gas is discharged to the atmosphere. Removal of $NO_x$ in this embodiment can be increased using EDTA or other well-known additives such as ferrous sulfate or ferrous chelate in the scrubbing liquid.

EXAMPLE 2

Figure 6:
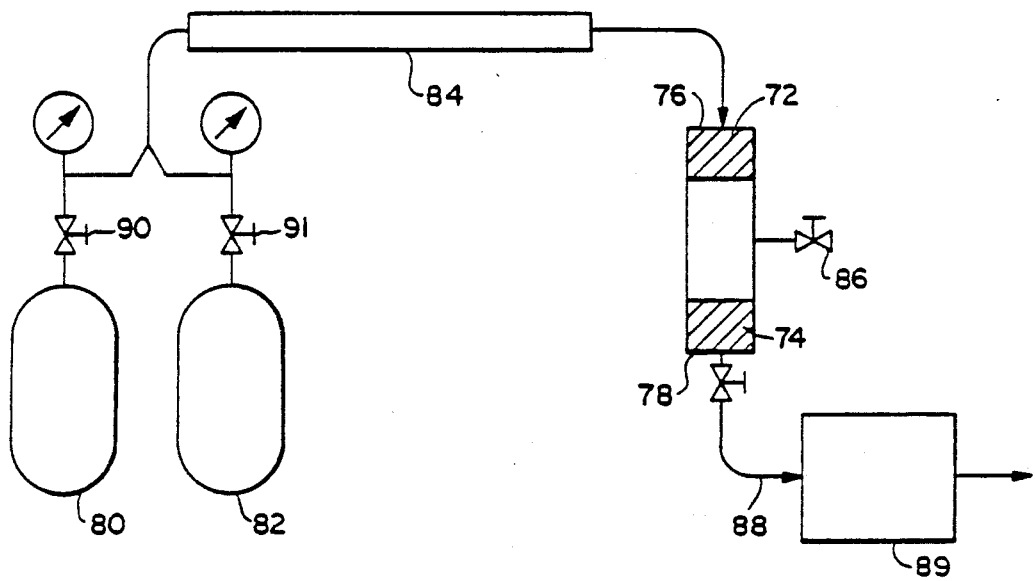
FIG. 6 is a schematic view of the apparatus used in carrying out Example 2.

Referring to FIG. 6, a series of a benchscale tests was conducted to determine the effects of contacting gas streams with comminuted Trona and Nahcolite for removing $SO_x$ and/or $NO_x$ therefrom.

A heated stainless steel reactor tube 70 was packed with fiberglass plugs 72 and 74 at the top and bottom ends respectively. Pipe caps 76 and 78 were screwed into the top and bottom ends of the reactor to hold the fiberglass plugs in place. Separate compressed gas cylinders 80 and 82 containing $NO_2$ (plus dry air) and $SO_2$ (plus dry air) respectively were connected to the top of the reactor 70 via an electrically heated sample line 84. The sample line 84 entered the top of the reactor 70 through a hole in the pipe cap 76. A port 86 was provided for injecting dry particulate Trona and/or Nahcolite into the reactor. A line 88 was connected between the bottom (outlet) of the reactor and a $NO_x/SO_x$ gas analyzer 89. The composition of the Nahcolite used during these tests was at least about 93% $NaHCO_3$, between about 1 and 3% $Na_2CO_3$ about 0.5% NaCl with the balance moisture. The composition of Trona used was from about 33-37% $Na_2CO_3$, 22-27% $NaHCO_3$, 4-8% NaCl, 5-7% $Na_2SO_4$, 6-10% water insolubles and 12-21% total $H_2O$.

Generally, the tests were conducted by heating the reactor and sample lines to a desired temperature. Then, after the $NO_x/SO_x$ gas analyzer had been calibrated, valves 90 and 91 on the outlets of the cylinders 80 and 82 were opened to provide a desired flow rate of $NO_2$ and $SO_2$ through the apparatus. The cylinders 80 and 82 contained $NO_2$ and $SO_2$ in trace amounts mixed with dry air as a carrier gas. The parts per million (ppm) of $SO_2$ and $NO_2$ entering the inlet of the reactor vessel were recorded. Dry sorbent was then injected into the reactor via the injection port 86. The ppm of $SO_2$ and $NO_2$ exiting the reactor were measured and the percentages of $NO_2$ and $SO_2$ which were removed were recorded.

The results of these experiments are shown in the following tables.

TABLE III

TRONA Injection Test at 190° F. Reactor Temperature

| Time (mins) | $NO_2$ (IN) (ppm) | $SO_2$ (IN) (ppm) | $NO_2$ Removal (%) | $SO_2$ Removal (%) |
|---|---|---|---|---|
| 0.0 | 46 | 114 | — | — |
| 10.0 | 46 | 114 | 43 | 96 |
| 15.0 | 46 | 114 | 54 | 96 |
| 25.0 | 46 | 114 | 50 | 96 |
| 40.0 | 46 | 114 | 37 | 96 |
| 40.0 | 33 | 230 | 83 | 92 |
| 45.0 | 33 | 230 | 83 | 92 |

TABLE IV

NAHCOLITE Injection Test at 190° F. Reactor Temperature

| Time (mins) | $NO_2$ (IN) (ppm) | $SO_2$ (IN) (ppm) | $NO_2$ Removal (%) | $SO_2$ Removal (%) |
|---|---|---|---|---|
| 0.0 | 41 | 163 | — | — |
| 2.0 | 41 | 163 | 59 | 94 |
| 8.0 | 41 | 163 | 76 | 94 |
| 14.0 | 41 | 163 | 62 | 94 |
| 20.0 | 41 | 163 | 43 | 94 |

TABLE V

| Time (mins) | $SO_2$ (IN) (ppm) | $SO_2$ (OUT) (ppm) | $NO_2$ (IN) (ppm) | $NO_2$ (OUT) (ppm) | $NO_2$ Removal (%) | $SO_2$ Removal (%) |
|---|---|---|---|---|---|---|
| NAHCOLITE Injection test at 400° F. Reactor Temperature | | | | | | |
| 0.0 | 184 | 18 | 80 | 22 | 72.5 | 90.2 |
| 1.0 | 184 | 18 | 80 | 20 | 75.0 | 90.2 |
| 2.0 | 184 | 18 | 80 | 22 | 72.5 | 90.2 |
| 2.25 | 0 | 0 | 176 | 35 | 80.1 | — |
| 2.50 | 0 | 0 | 176 | 40 | 77.3 | — |
| 2.75 | 0 | 0 | 176 | 46 | 73.9 | — |
| 3.00 | 0 | 0 | 176 | 56 | 68.2 | — |
| 3.25 | 0 | 0 | 176 | 60 | 65.9 | — |
| 3.50 | 0 | 0 | 176 | 61 | 65.3 | — |
| 3.75 | 0 | 0 | 176 | 64 | 63.6 | — |
| 4.0 | 184 | 18 | 80 | 26 | 67.5 | 90.2 |
| 5.0 | 184 | 18 | 80 | 28 | 65.0 | 90.2 |
| 7.0 | 184 | 18 | 80 | 30 | 62.5 | 90.2 |

Additional NAHCOLITE Injected at Ten Minutes

TABLE V-continued

| Time (mins) | $SO_2$ (IN) (ppm) | $SO_2$ (OUT) (ppm) | $NO_2$ (IN) (ppm) | $NO_2$ (OUT) (ppm) | $NO_2$ Removal (%) | $SO_2$ Removal (%) |
|---|---|---|---|---|---|---|
| From Start of Test | | | | | | |
| 10.0 | 217 | 26 | 63 | 14 | 77.8 | 88.0 |
| 11.0 | 217 | 26 | 63 | 18 | 71.4 | 88.0 |
| 12.0 | 217 | 26 | 63 | 21 | 66.7 | 88.0 |
| 12.5 | 217 | 26 | 63 | 25 | 60.3 | 88.0 |
| 13.0 | 217 | 26 | 63 | 28 | 55.6 | 88.0 |
| 14.0 | 217 | 26 | 63 | 29 | 54.0 | — |
| 14.25 | 0 | 0 | 176 | 40 | 71.5 | — |
| 14.75 | 0 | 0 | 176 | 67 | 62.0 | — |
| 15.75 | 0 | 0 | 176 | 90 | 48.9 | 88.0 |
| 16.0 | 217 | 26 | 63 | 30 | 52.4 | 88.0 |
| 18.0 | 217 | 26 | 63 | 32 | 49.2 | 88.0 |
| 22.0 | 217 | 26 | 63 | 36 | 42.9 | 88.0 |
| 25.0 | 217 | 26 | 63 | 36 | 42.9 | 88.0 |

EXAMPLE 3

Figure 7:
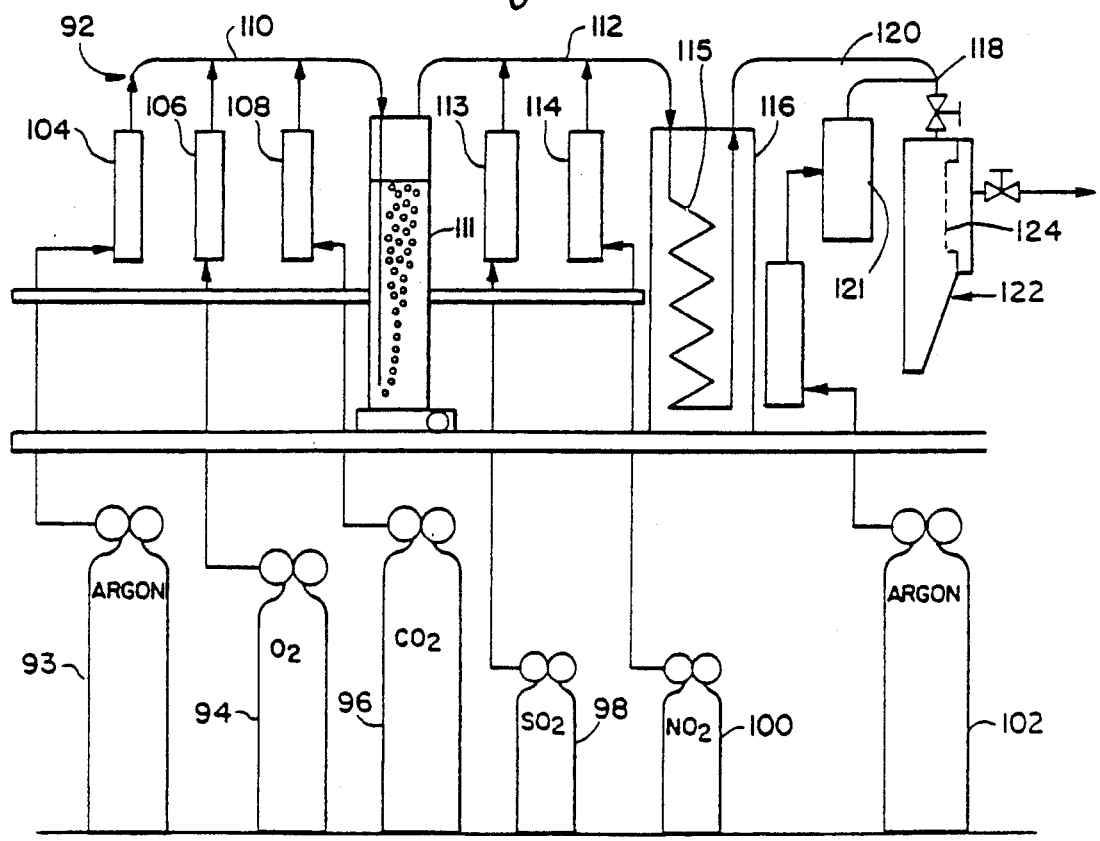
FIG. 7 is a schematic view of the apparatus used in carrying out Example 3.

Referring to FIG. 7, a second series of benchscale experiments similar to the experiments of Example I were conducted.

The test apparatus 92 used in the second series of experiments included compressed gas cylinders 93, 94, 96, 98, 100 and 102 containing argon, $O_2$, $CO_2$, $SO_2$, $NO_2$ and argon respectively. Argon (cylinder 93), $O_2$ and $CO_2$ were initially metered via calibrated rotameters 104, 106 and 108 respectively, into a common manifold line 110, through a water column 111 and into the line 112. Next, the $SO_2$ and $NO_2$ test gases at concentrations (in Argon carrier gas) of about fifteen thousand ppm and five thousand ppm respectively were introduced into the line 112 through rotameters 113 and 114.

The mixture of test gases was then passed (in a tube 115) through an oil bath 116 which was maintained at a temperature which could be adjusted to between 300° F. and 400° F. A tee 118 was in the sample line 120 at the outlet of the oil bath to allow sorbent from a fluidized bed sorbent feeder 121 into the sample line upstream from a filter housing 122. The filter housing 122 included a 6-inch diameter filter 124 which was precoated with diatomaceous earth or highly pulverized calcium sulfate powder so that the pressure drop across the filter could be maintained at about 3 inches of water during the tests. The filter housing 122 was insulated and heated to allow adjustment of the gas temperature inside the filter. During the course of the tests, $NaHCO_3$ powder was deposited on the filter leaving a partially-reacted sorbent cake at the end of the run. Each run lasted about 15 to 30 minutes.

The temperature of the inlet gases introduced into the filter housing was adjusted by changing the power input to the heat tape (not shown) located between the stainless steel filter housing shell and an outer layer of insulation (not shown) which surrounded the filter housing. The filter housing temperature was measured with a thermocouple probe (not shown) placed in the inlet gas stream about 1 inch above the filter.

Figure 8:
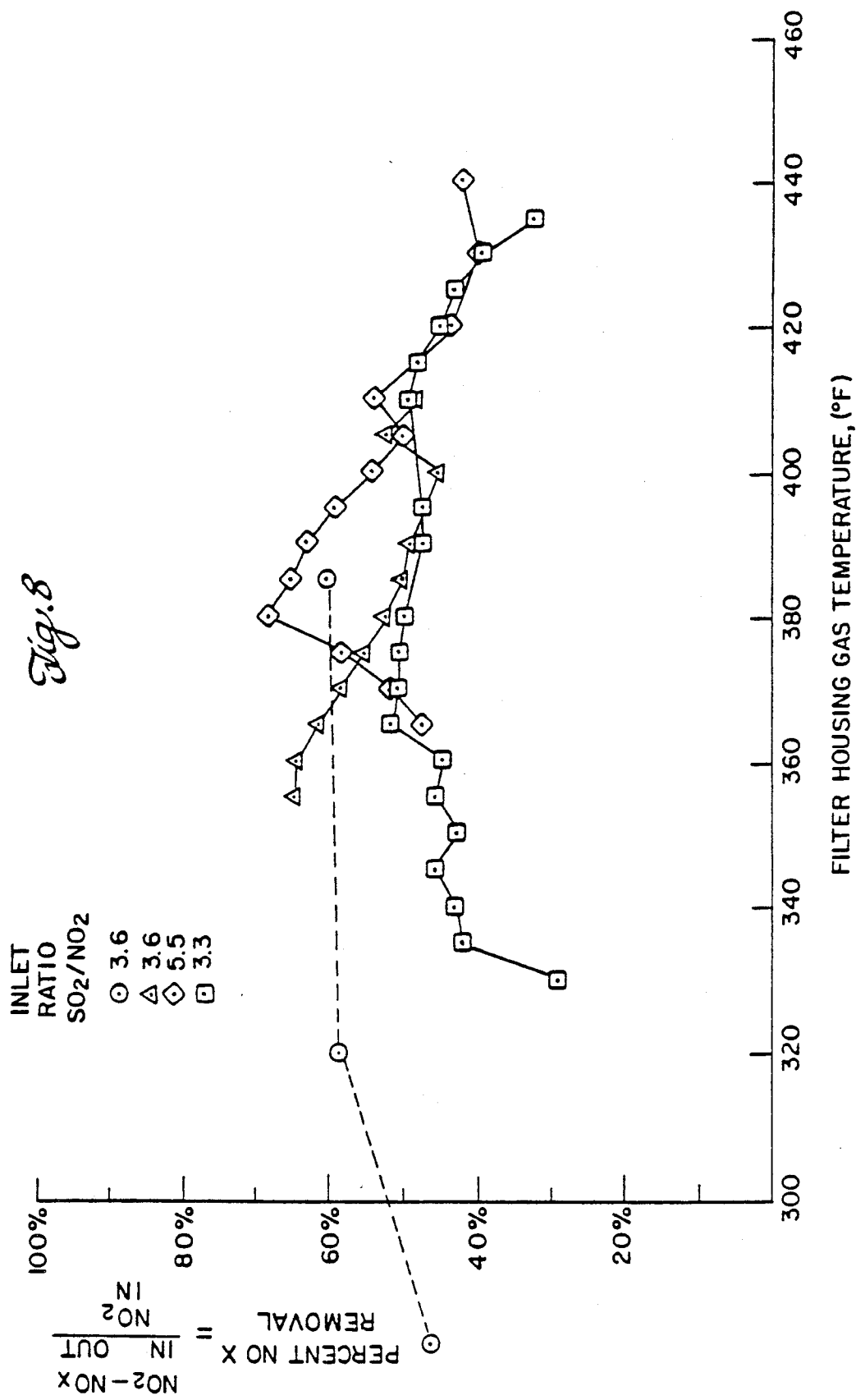
FIGS. 8 and 9 are graphs showing results of Example 3 under the following conditions; Inlet $SO_2$ concentration 475 ppm; Excess $O_2$—4%; Inlet $CO_2$—12%; Inlet $H_2O$—less than 1%; Argon carrier—balance.
Figure 9:
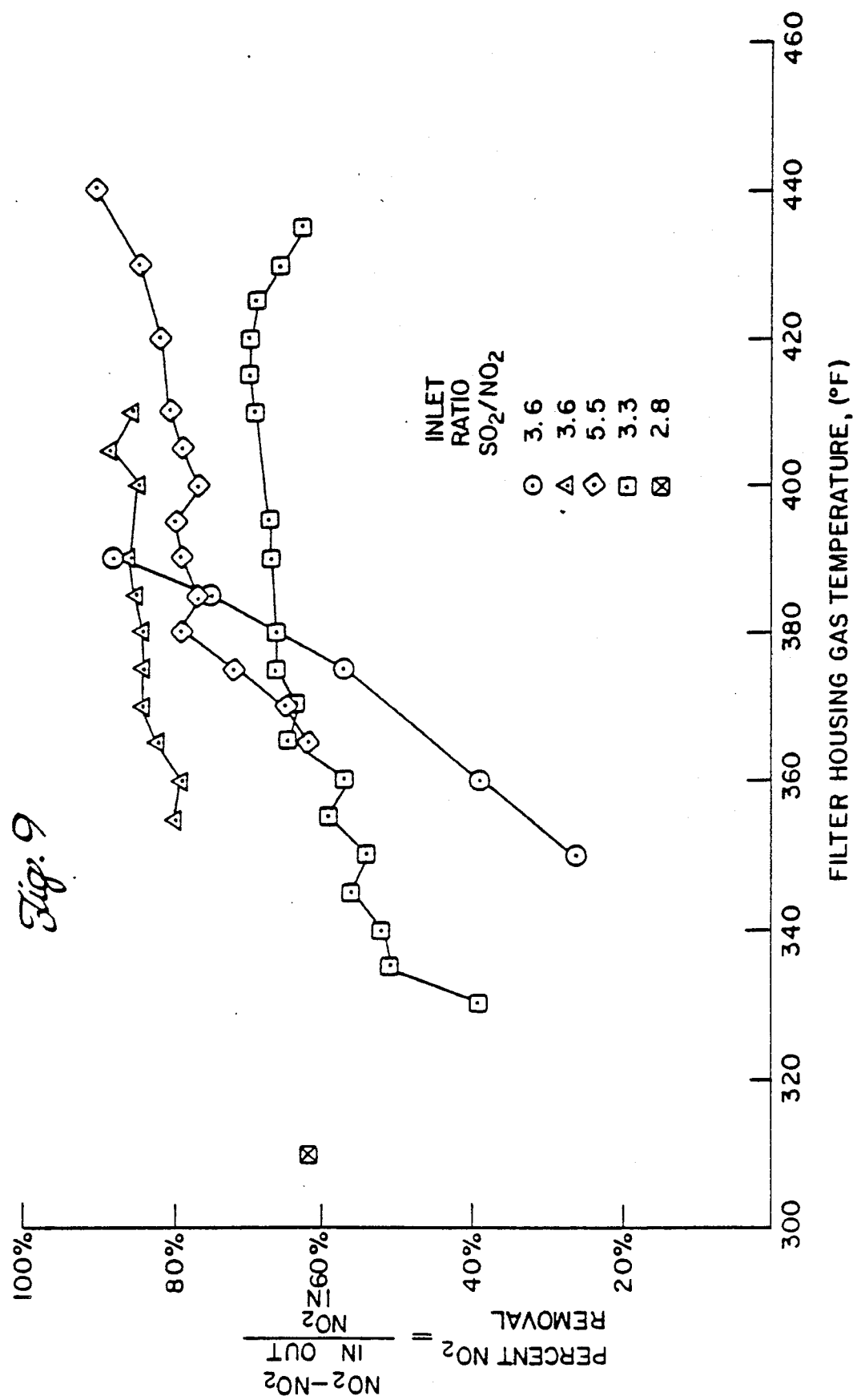

The results of the tests at various $SO_2/NO_2$ molar ratios, 475 ppm $SO_2$, 4% excess $O_2$, 12% $CO_2$, less than 1% $H_2O$, balance argon are shown in FIGS. 8, 9 and 10.

FIG. 8 shows that overall $NO_x$ removal with dry test gases fell somewhere between about 50% and 70% when the filter housing gas temperatures were in the range of from about 360° F. to 400° F.

FIG. 9 shows that at temperatures in the temperature range of from about 340° F. to 400° F., between about 60% and 90% of the inlet $NO_2$ is eliminated in the process as described above.

The desired temperature of the gas stream as it is contacted by the particulate sorbent for removal of $NO_x$ and $SO_x$ is between about 200° F. and 450° F. Preferably, the temperature is between about 300° F. and 400° F. when nahcolite sorbent is used.

EXAMPLE 4

Effect of Adding Water Vapor on Outlet $SO_2$ and $NO_x$ Concentrations

The effects of adding water vapor at low concentrations on outlet $SO_2$ and $NO_x$ concentrations can be seen in Table VI below. This experiment was run at a temperature of 237° F., a pressure drop of 0.6 inches $H_2O$, a sorbent comprising 50% $NaHCO_3$ in a diatomaceous earth filter aid; an inlet $SO_2$ concentration of 471 ppm; and an inlet $NO_2$ concentration of 173 ppm.

TABLE VI

| EFFECT OF ADDING WATER VAPOR ON REMOVAL OF $NO_2$ AND $SO_2$ | | |
|---|---|---|
| Water Content of Gas (ppm) | 0 | 8000 |
| Outlet $SO_2$ Conc. (ppm) | 80 | 35 |
| $SO_2$ Removal (%) | 83.0 | 92.6 |
| Outlet $NO_x$ Conc. (ppm) | 108 | 101 |
| $NO_x$ Removal (%) | 37.6 | 41.6 |

The results of this test indicate that a small amount of water vapor enhances both $SO_2$ and $NO_x$ removal.

The amount of $NaHCO_3$ sorbent used can also be important. For example, as can be seen by equation (V) it takes two moles of $NaHCO_3$ to remove each mole of $SO_2$ and each ½ mole of $NO_2$. Preferably, the stoichiometric ratio of sorbent to $SO_x$ is greater than 1 and more preferably is greater than 4. As can be seen by referring to FIG. 10 the percent removal of both $SO_x$ and $NO_x$ using $NaHCO_3$ sorbent increases with an increasing sorbent stoichiometric ratio. Since it may be costly to operate a baghouse with a fresh sorbent stoichiometric ratio of 4, it is anticipated that similar results can be achieved using baghouse sorbent recycle and a fresh sorbent stoichiometric ratio of less than 2. Also as can be seen, for a given stoichiometric ratio the percentage of $NO_x$ removed is greater when the molar ratio of $SO_2/NO_x$ in the gas is 6 than when the molar ratio is 4.

EXAMPLE 5

Effect of Eliminating Presence of $SO_2$ on Sorption of $NO_x$ with Nahcolite Sorbent The effects of eliminating $SO_2$ on the ability to produce $NO_x$ sorption with nahcolite sorbent can be seen in Table VII below. These experiments were run at temperatures of 306° F. and 422° F., using $NaHCO_3$ sorbent at a stoichiometric ratio of about 1.0 on a filter cloth precoated with highly-pulverized $CaSO_4$. The gas composition was as follows: 2.9% to 3.2% $O_2$; 14.5% to 14.9% $CO_2$; 11.0% to 11.5% $H_2O$; and balance nitrogen. The gas flowrate was about 3.0 to 3.4 ft/min. through the filter cloth.

TABLE VII

| EFFECT OF ELIMINATING PRESENCE OF $SO_2$ ON SORPTION OF $NO_x$ WITH NAHCOLITE SORBENT | | |
|---|---|---|
| Baghouse Temperature | 306° F. | 422° F. |
| Inlet $NO_x$ concentration (ppm) | 128 | 137 |
| Inlet $SO_2/NO_x$ ratio | 4.6 | 4.9 |
| Outlet $NO_x$ concentration (ppm) | 103 | 109 |
| Inlet $SO_2/NO_x$ ratio | 0 | 0 |

TABLE VII-continued

| EFFECT OF ELIMINATING PRESENCE OF $SO_2$ ON SORPTION OF $NO_x$ WITH NAHCOLITE SORBENT | | |
|---|---|---|
| Outlet $NO_x$ concentration (ppm) | 127 | 132 |

In these tests, the inlet $NO_x$ consisted of at least 75% $NO_2$. As is seen in Table VII, the $NO_x$ removal was negligible when the inlet $SO_2/NO_x$ ratio was reduced to zero. This shows that the presence of $SO_2$ is required for $NO_x$ sorption on a sodium-based alkali such as nahcolite.

Although a large percentage of $NO_x$ is removed from a gas stream by techniques provided in accordance with the above-described practice of the present invention by contacting the $NO_x$ containing gas stream with dry sodium based sorbents, some $NO_2$ may remain. A further technique is therefore provided in accordance with this invention to remove $NO_2$ which may remain in the gas stream after treatment with dry particulate sorbent.

$NO_2$ is known to be sorbed on oxides of the following metals, or alloys of the following metals including: aluminum, zirconium, nickel, iron, copper, magnesium, titanium and the like. The metal oxide can be provided on a suitable supporting substrate to preferably provide a metal oxide specific surface area of greater than about ten square meters per gram of total sorbent material. $NO_2$ is sorbed primarily as a surface nitrate having a nitrato bidentate attachment to the surface. NO is also sorbed, but not nearly as easily as $NO_2$.

Turning now to FIG. 11 (in addition to FIG. 1), a schematic perspective view of a $NO_x$ sorption system 130 which can be installed in accordance with practice of this invention, for example, in the duct 30 from the baghouse 26 is shown. The sorbent-free flue gas, which exits the baghouse in the duct 30, (see FIG. 1) passes through a bed 132 of metal oxide pebbles or pellets having a high specific surface area for the metal oxide 133. In an exemplary embodiment, for example, a flue gas velocity of 40 feet/second across a bed 4 feet thick provides a 0.1 sec. residence time, and results in a gas-side pressure drop of less than about 1.0 in. $H_2O$. During the $NO_x$ sorption process the pellets 133 move slowly downwardly in the bed 132 and are eventually discharged from the bed into a hopper 134 located, for example, below the flue gas duct 30. The pellets which have $NO_x$ sorbed thereon and have been discharged into the hopper 134 (the spent pellets) are regenerated by driving the $NO_x$ from the pellets in the form of NO. This is accomplished, for example, in a fluidized bed 138. The pellets pass from the hopper 134 through a rotary lock valve 136 into the fluidized bed. As the pellets are heated in the fluidized bed, NO is driven from the pellets. The NO containing off gas from the fluidized bed is recycled at a high temperature, e.g., about 750° F. through the line 139 back to the burners 12 (shown in FIG. 1) of the boiler 10. Since the total NO produced in the boiler is in thermodynamic equilibrium, most of the extra NO introduced by the metal oxide regeneration system is destroyed in the main burner flame. Waste heat from the hot regenerated pellets can be recaptured by counterflow heat exchange against the ambient air being supplied to the burner system for the fluidized bed, if desired. Cooled, regenerated metal oxide pellets can be pneumatically conveyed to the top of the pellet bed duct, for example, by means of a conveyor system 140 which includes a blower 142, a cyclone 144 and a conveying line 146 between the blower and cyclone. The regenerated metal oxide pellets pass from the fluidized bed by means of a rotary valve 148 into the line 146 and are conveyed into the cyclone 144 at the top of the bed 132. The pellets pass from the cyclone back into the bed through a rotary lock valve 150 at the top of the bed. Fines can be recovered from the top of cyclone by means of the line 152 connected to a filter 153 by a suitable duct (not shown).

EXAMPLE 6

Final Removal of $NO_x$ from Flue Gas Downstream from a Baghouse

Referring to FIG. 5, the same boiler that was used for Example I was also used in the experiments of this example. In order to contact $NO_x$ with a metal oxide for removal of such $NO_x$, a 20 foot length of 0.25 in. O.D. oxidized aluminum tubing 160 was connected to the offgas stack 62 at the connection 61.

Approximately 2.5 SCFH of sample gas was withdrawn through the tubing to thereby contact its $Al_2O_3$ inner surface. The calculated inside volume of the tubing was 6.6 in.$^3$, giving a flue gas residence time of about 90 milliseconds. The inside surface area of the tubing was 140 in.$^2$.

Short-duration screening tests were carried out to determine the effects of the $Al_2O_3$ on NO and $NO_2$ removal, and also to verify that the $Al_2O_3$ could be regenerated upon heating by driving off $NO_x$ in the form of nitric oxide (NO) gas.

In order to conduct the tests, NO gas was injected into the burner 58 at the discharge of the fan 60. The NO injection rate was controlled by a rotameter (not shown).

Flue gas samples were continuously withdrawn from the boiler stack 62 through the $Al_2O_3$ tubing 160 at a rate of about 2.5 SCFH and passed through two series impingers in an ice bath to remove excess moisture (not shown). The gas sample was then passed through a NO—$NO_x$ analyzer and through a portable oxygen detector for excess $O_2$ measurement.

During tests at an average temperature of about 200° F., the sorption of $NO_x$ was very high, with a total residence time of about 0.1 seconds through the aluminum oxide tubing. The data shown in Table VIII was taken during the sorption mode at 4.2% excess $O_2$ content in the gas sample:

TABLE VIII

| SORPTION MODE (3% $O_2$, DRY) | |
|---|---|
| Initial NO: | 38 ppm |
| Final NO: | 3 ppm |
| NO Removal: | 92% |
| Initial $NO_x$: | 140 ppm |
| Final $NO_x$: | 20 ppm, and continuing to drop |
| $NO_x$ Removal: | 86% |

The reaction of $NO_x$ on the $Al_2O_3$ tubes appeared to produce oxygen off-gas. It is postulated that the $Al_2O_3$ tubing was thoroughly oxidized and sorption of $NO_2$ onto the surface layer produced one-half mole of $O_2$ for each mole of $NO_2$ sorbed. The reaction of $Al_2O_3$ with $NO_2$ is shown in the following equation:

$$Al_2O_3 + NO_2 \rightarrow Al_2O_3NO + \tfrac{1}{2}O_2 \qquad \text{(VII)}$$

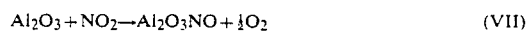

The aluminum oxide was regenerated by passing a propane torch over the tubing (for about 5 minutes).

Oxygen was sorbed during the regeneration step, and the NO—$NO_x$ levels were increased beyond the inlet levels. The results of the regeneration tests are shown in Table IX.

TABLE IX

REGENERATION OF $AL_2O_3$ TUBING
(3% $O_2$, DRY)

| | |
|---|---|
| Initial NO: | 38 ppm |
| Final NO: | 45 ppm and climbing |
| Initial $NO_x$: | 140 ppm |
| Final $NO_x$: | 150 ppm, and climbing |

EXAMPLE 7

Conversion of NO to $NO_2$ Followed by Sorption of $SO_x$ and $NO_x$ in a Baghouse The same boiler that was used for Example 1 was also used in the experiments of this example, except that a pulse jet baghouse, manufactured by EVO Corporation, Model NF-9, was placed downstream from the boiler. The baghouse incorporates eight bags having a total of 40 square feet of filtration surfaces. The filtration material was felted Nomex cloth. The baghouse was supplied with a variable-speed I.D. fan used to overcome the pressure drop through the bags and to balance the draft requirements of the boiler. In this example the pressure drop across the bags was approximately 3 inches of water and the air to cloth ratio was about 3.1 ACFM/ft$^2$.

As shown in Table X, without upstream NO to $NO_2$ conversion, approximately 24% $NO_x$ removal was obtained at a high sorbent stoichiometric ratio between 3 and 4 also resulting in a high $SO_2$ removal of 97%. However, the amount of $NO_2$ increased by 47 ppm as a result of the simultaneous removal of $SO_2$ and $NO_x$. It should be noted that the initial levels of $NO_2$ at the baghouse inlet is an artifact of the method of introducing concentrated nitric oxide (NO) gas directly into the boiler system. Much lower initial levels of $NO_2$ at the baghouse inlet would normally be expected in a conventional boiler system.

TABLE X

COMPARISON OF $SO_2$ AND $NO_x$ REMOVAL WITH AND WITHOUT UPSTREAM CONVERSION OF NO TO $NO_2$

Tests conducted with dry Trona powder
Without Upstream NO to $NO_2$ Conversion

| | | |
|---|---|---|
| Baghouse Temperature: | | 310° F. |
| Initial NO/$NO_2$ Ratio: | | 2.7 |
| Initial $SO_2$/$NO_x$ Ratio: | | 4.8 |

Flue Gas Concentrations
(ppmv, corrected to 3% $O_2$, dry)

| $O_2$ | | $SO_2$ | NO | $NO_2$ | $NO_x$ |
|---|---|---|---|---|---|
| 5.5% | Baghouse Inlet Injection Probe Off | 718 | 110 | 41 | 151 |
| 10.5% | Baghouse Outlet Injection Probe Off | 21 | 26 | 88 | 114 |
| | $SO_2$ Removal: 97% | | | | |
| | $NO_x$ Removal: 24% | | | | |

Tests conducted with dry Trona powder
With Upstream NO to $NO_2$ Conversion

| | | |
|---|---|---|
| Baghouse Temperature: | | 320° F. |
| Initial NO/$NO_2$ Ratio: | | 3.4 |
| Initial $SO_2$/$NO_x$ Ratio: | | 4.2 |

Flue Gas Concentrations
(ppmv, corrected to 3% $O_2$, dry)

| $O_2$ | | $SO_2$ | NO | $NO_2$ | $NO_x$ |
|---|---|---|---|---|---|
| 4.5% | Baghouse Inlet Injection Probe Off | 710 | 129 | 38 | 167 |
| 9.5% | Baghouse Outlet | 46 | 17 | 74 | 91 |

TABLE X-continued

COMPARISON OF $SO_2$ AND $NO_x$ REMOVAL WITH AND WITHOUT UPSTREAM CONVERSION OF NO TO $NO_2$

Injection Probe On
$SO_2$ Removal: 94%
$NO_x$ Removal: 46%

The practice of the present invention provides surprisingly higher levels of $NO_x$ removal, in combination with $SO_2$ removal. As shown in Table X, with upstream NO to $NO_2$ conversion, approximately 46% $NO_x$ removal was obtained at a lower stoichiometric ratio of about 2, also resulting in a lower $SO_2$ removal of 94%. This improvement in $NO_x$ removal also occurred with a lower level of initial $SO_2$/$NO_x$ ratio, which further demonstrates the usefulness of the present invention. Furthermore, the amount of $NO_2$ increased by 36 ppm (as compared with the previous result of 47 ppm), showing that the amount of $NO_2$ resulting from simultaneous removal of $SO_2$ and $NO_x$ was reduced. As previously described, the present invention provides a process for removing this $NO_2$ byproduct using a downstream metal oxide absorption section.

The above descriptions of exemplary embodiments for removing $NO_x$ and $SO_x$ from flue gas streams are for illustrative purposes. Because of variations, which will be apparent to those skilled in the art, the present invention is not intended to be limited to the particular embodiments described above. For example, it would be possible to accomplish $NO_x$ reduction in the absence of $SO_2$ by converting NO to $NO_2$ in the boiler convective section with the injection of a peroxyl initiator as described above, and then accomplish $NO_x$ sorption with a regenerable metal oxide. In this embodiment, for example, regenerable metal oxides such as those described above can be introduced in powder form into the absorption zone for contacting a flue gas stream that contains oxides of nitrogen such as $NO_2$. The metal oxide removes the oxides of nitrogen from the gas stream and is separated from the gas stream for example, in a baghouse. The metal oxide can then be regenerated for reuse by heating it to at least about 700° F. Such heating produces an off-gas containing NO which can be recycled to the burner section of the boiler. The scope of the invention is defined in the following claims.

What is claimed is:

1. An apparatus for converting NO to $NO_2$, comprising:
   a) means for providing a flow path for gas, wherein said gas flow path means includes a gas contacting section;
   b) means for introducing a gas stream containing NO and $NO_2$ at a first NO/$NO_2$ molar ratio into the gas contacting section; and
   c) means for mixing together a peroxyl initiator and an oxygen-containing gas and for introducing the mixture as an injection fluid into the gas contacting section for contacting the NO containing gas stream, the fluid mixing and introduction means comprising a preheater for the injection fluid capable of heating the injection fluid to a temperature in the range of 400° F. and 800° F., the peroxyl initiator and oxygen being present in the gas contacting section to convert NO to $NO_2$ to thereby provide a gas stream exiting the contacting section that contains NO and $NO_2$ at a second NO/$NO_2$ molar ratio wherein the second $NO/NO_2$ molar ratio is less than the first $NO/NO_2$ molar ratio.

2. The apparatus of claim 1 wherein the preheater for the injection fluid, preheats injection fluid which comprises propane, to a temperature in the range of ambient temperature and 800° F. and oxygen in the range of 5% and 20% by volume based on the total volume of the injection fluid.

3. The apparatus of claim 1 wherein the injection fluid mixing and introduction means comprises an array of distributor tubes with each distributor tube having a plurality of holes therein through which the injection fluid passes.

4. The apparatus of claim 3 wherein the distributor tube holes are aligned so that the direction of flow of the injection fluid from the distributor tubes is at an angle of from 10° to 20° from the plane of the array in the direction of flue gas flow.

5. An apparatus for removing nitrogen oxides and sulfur oxides from a gas stream, the apparatus comprising:
    a) an NO to $NO_2$ conversion section comprising:
        i) a gas duct having an inlet and an outlet and a gas contacting section therebetween;
        ii) means for introducing a first gas stream containing NO, $NO_2$ and sulfur oxides into the gas duct inlet, said NO and $NO_2$ present in a first $NO/NO_2$ molar ratio;
        iii) means for mixing together a peroxyl initiator and oxygen and for introducing the mixture as an injection fluid into the gas duct contacting section for contacting the NO, $NO_2$ and sulfur oxides containing first gas stream, the fluid mixing and introduction means comprising a preheater for the injection fluid capable of heating the injection fluid to a temperature in the range of 400° F. and 800° F., the peroxyl initiator and oxygen being present in the gas duct to convert NO to $NO_2$ to thereby provide a second gas stream exiting the contacting section, the second gas stream containing NO and $NO_2$ at a second $NO/NO_2$ molar ratio wherein the second molar ratio is less than the first molar ratio; and
    b) an absorption section comprising:
        i) means for receiving the second gas stream as it exits the NO to $NO_2$ conversion section;
        ii) means for introducing a dry particulate sorbent into the second gas stream for sorbing oxides of sulfur and nitrogen therefrom to thereby provide a reacted sorbent;
        iii) means for removing reacted sorbent and any unreacted sorbent from the second gas stream to provide a clean waste gas stream; and
        iv) means for discharging the clean waste gas stream into the atmosphere.

6. The apparatus of claim 5 wherein the preheater for the injection fluid preheats the injection fluid which comprises propane, to a temperature in the range of ambient temperature and 800° F. and oxygen in the range of 5% and 20% by volume based on the total volume of the injection fluid.

7. The apparatus of claim 5 wherein the preheater comprises an array of distributor tubes with each distributor tube having a plurality of holes therein through the injection fluid passes.

8. The apparatus of claim 7 wherein the distributor tube holes are aligned so that the direction of flow of the injection fluid from the distributor tubes is at an angle of from 10° to 20° from the plane of the array in the direction of fluid gas flow.

9. The apparatus of claim 5 wherein the reacted and unreacted sorbent removal means comprises a baghouse and the particulate sorbent introduction means comprises a plurality of tubes extending into the flue gas flow path upstream from the baghouse.

10. The apparatus of claim 5 wherein the absorption section comprises a baghouse and the particulate sorbent introduction means comprises a spray dryer located in flow connection with and upstream from the baghouse, said particulate sorbent being introduced into the flue gas stream in the spray dryer, the flue gas and entrained particulate sorbent being discharged into the baghouse.

11. The apparatus of claim 5 wherein the reacted and unreacted sorbent removal means comprises a baghouse and the absorption section additionally comprises means in flow connection with and downstream from the baghouse for contacting the gas stream exiting the baghouse with a metal oxide sorbent for $NO_x$.

12. The apparatus of claim 5 wherein the reacted and unreacted sorbent removal means comprises a baghouse comprising filtration surfaces and wherein the apparatus additionally comprises means for recycling sorbent removed from the second gas stream back into the second gas stream at any point in flow connection with and upstream from the baghouse filtration surfaces.

13. The apparatus of claim 12 wherein the baghouse comprises an inlet duct comprising a plurality of nozzles designed to introduce the gas stream into the baghouse filtration surfaces.

14. An apparatus for converting NO to $NO_2$ comprising:
    a) means for providing a flow path for gas, said means including a gas contacting section;
    b) means for flowing a gas stream containing NO and $NO_2$ at a first $NO/NO_2$ molar ratio through the contacting section;
    c) heating means comprising a gas injection grid and distributor tubes for introducing an injection fluid which comprises a peroxyl initiator mixed together with an oxygen-containing gas into the contacting section in a sufficient quantity and at a sufficient velocity to thereby provide that such injection fluid is not heated to more than 800° F. prior to introduction of the injection fluid into the contacting section, the $NO/NO_2$ containing gas stream contacting the injection fluid as said $NO/NO_2$ containing gas stream flows through the contacting section, wherein the injection fluid contains a sufficient quantity of peroxyl initiator and oxygen to provide that NO, upon contact with the injection fluid, is converted to $NO_2$.

15. The apparatus of claim 14 wherein the gas injection grid and distributor tubes comprise a plurality of gas nozzles extending in an array across the gas contacting section.

16. The apparatus of claim 14 wherein the injection fluid mixing and introduction means comprises a preheater for the injection fluid capable of heating said injection fluid to between ambient temperature and 800° F.

17. The apparatus of claim 14 wherein the gas flow means is capable of providing the $NO/NO_2$ containing gas stream with a velocity in the range of from 30 feet per second to 70 feet per second while the injection fluid mixing and introduction means includes a plurality of nozzles wherein each such nozzle is capable of providing the injection fluid with a velocity of at least 10 times the velocity of the $NO/NO_2$ containing gas stream.

* * * * *

UNITED STATES PATENT AND TRADEMARK OFFICE
CERTIFICATE OF CORRECTION

PATENT NO. : 5,120,508
DATED : June 9, 1992
INVENTOR(S) : Dale G. Jones

It is certified that error appears in the above-identified patent and that said Letters Patent is hereby corrected as shown below:

Column 1, line 35, change "dxides" to -- oxides --.

Column 2, line 24, before "and sulfur" delete the space.

Column 18, line 64, change "400° F and 800° F" to -- 400°F to 800°F --.

Column 19, lines 3-8, delete claim 2 in its entirety and insert therefor:

-- 2. The apparatus of claim 1 wherein the injection fluid preheater preheats the injection fluid, which comprises propane and oxygen in the range of 5% to 20% by volume, based on the total volume of the injection fluid, to a temperature in the range of ambient temperature to 800°F. --

Column 19, line 36, change "400° F and 800° F to -- 400°F to 800°F. --

UNITED STATES PATENT AND TRADEMARK OFFICE
CERTIFICATE OF CORRECTION

PATENT NO. : 5,120,508
DATED : June 9, 1992
INVENTOR(S) : Dale G. Jones

It is certified that error appears in the above-identified patent and that said Letters Patent is hereby corrected as shown below:

Column 19, lines 54-59, delete claim 6 in its entirety and insert therefor:

-- 6. The apparatus of claim 5 wherein the injection fluid preheater preheats the injection fluid, which comprises propane and oxygen in the range of 5% to 20% by volume, based on the total volume of the injection fluid, to a temperature in the range of ambient temperature to 800°F. --

Column 19, lines 60-63, delete claim 7 in its entirety and insert therefor:

-- 7. The apparatus of claim 5 wherein the means for introducing the injection fluid comprises an array of distributor tubes with each distributor tube having a plurality of holes therein through which the injection fluid passes. --

Signed and Sealed this

Twelfth Day of October, 1993

Attest:

BRUCE LEHMAN

*Attesting Officer*    *Commissioner of Patents and Trademarks*